United States Patent
Shim et al.

(10) Patent No.: US 6,930,619 B2
(45) Date of Patent: Aug. 16, 2005

(54) DATA MODULATION METHOD, AND RECORDING AND REPRODUCING APPARATUSES AND METHODS ADOPTING THE DATA MODULATION METHOD

(75) Inventors: Jae-seong Shim, Seoul (KR); Jung-wan Ko, Gyeonggi-do (KR); Ki-hyun Kim, Seoul (KR); Hyun-soo Park, Seoul (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 09/985,162

(22) Filed: Nov. 1, 2001

(65) Prior Publication Data
US 2002/0105884 A1 Aug. 8, 2002

(30) Foreign Application Priority Data
Feb. 5, 2001 (KR) .......................................... 2001-5370

(51) Int. Cl.[7] ............................................... H03M 7/00
(52) U.S. Cl. ............................... 341/59; 341/58; 341/60
(58) Field of Search ............................ 341/50, 51, 52, 341/58, 59, 60, 69, 94

(56) References Cited

U.S. PATENT DOCUMENTS

| 5,604,725 | A | * | 2/1997 | Fuji | 369/59.23 |
| 5,696,505 | A | * | 12/1997 | Schouhamer Immink | 341/59 |
| 5,812,073 | A | * | 9/1998 | Lee et al. | 341/59 |
| 5,969,649 | A | * | 10/1999 | Ashley et al. | 341/59 |
| 6,011,497 | A | * | 1/2000 | Tsang et al. | 341/59 |
| 6,018,304 | A | * | 1/2000 | Bessios | 341/58 |
| 6,091,347 | A | * | 7/2000 | Nakagawa et al. | 341/59 |

FOREIGN PATENT DOCUMENTS

| JP | 5-198100 | 8/1993 |
| JP | 7-169059 | 7/1995 |
| JP | 2002-197812 | 7/2002 |

\* cited by examiner

Primary Examiner—Michael Tokar
Assistant Examiner—Linh V. Nguyen
(74) Attorney, Agent, or Firm—Stein, McEwen & Bui, LLP

(57) ABSTRACT

A method of and an apparatus for modulating data to be resistant to channel distortion. A space extending encoder performs a first code transformation to extend a run length of digitized data to a predetermined length and outputs the space-extended data. A multiplexer multiplexes the space-extended data and data transformed by a predetermined second code transformation. A format converter converts the multiplexed data into a predetermined format which is suitable for writing to a recording medium. The apparatus and method enable recorded data to be resistant to channel distortion, enable the data to be recorded with increased recording density, and enable the data written to the recording medium to be reproduced with improved reliability.

35 Claims, 17 Drawing Sheets

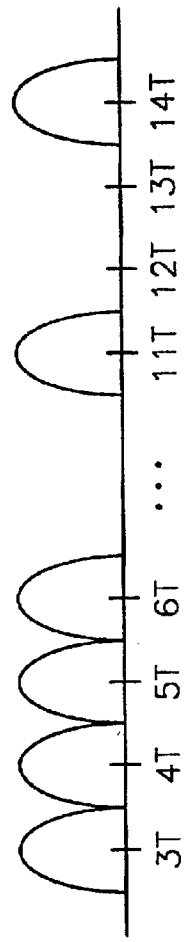

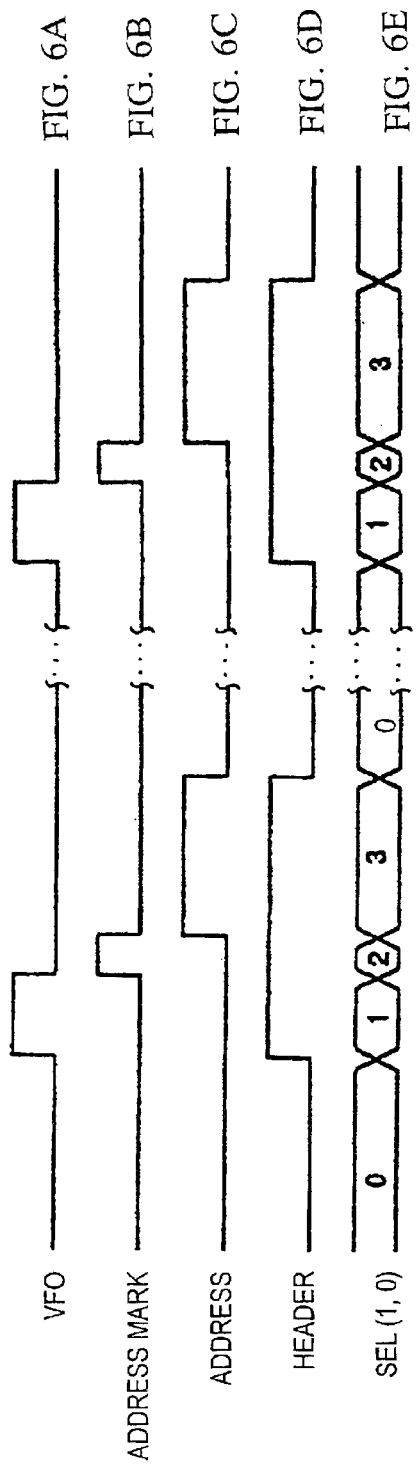

FIG. 11A

| SEGMENT | VFO | AM | PID | IED |
|---|---|---|---|---|
| BYTES | 21 | 2 | 4 | 2 |
| BITS | 576 | 54 | 108 | 54 |
| BITS IN TOTAL | 783 | | | |

FIG. 11B

| SEGMENT | VFO | AM | PID | IED | VFO | AM | PID | IED |
|---|---|---|---|---|---|---|---|---|
| BYTES | 21 | 2 | 4 | 2 | 21 | 2 | 4 | 2 |
| BITS | 567 | 54 | 108 | 54 | 567 | 54 | 108 | 54 |
| BITS IN TOTAL | 1566 | | | | | | | |

FIG. 16

| Data | Codeword | Data | Codeword | Data | Codeword | Data | Codeword |
|---|---|---|---|---|---|---|---|
| 000 | 001000101 | 064 | 001110111 | 128 | 110101011 | 192 | 001000110 |
| 001 | 001001010 | 065 | 001111101 | 129 | 110101101 | 193 | 010001010 |
| 002 | 001001111 | 066 | 010001011 | 130 | 110101110 | 194 | 010001111 |
| 003 | 001011011 | 067 | 010001110 | 131 | 110110101 | 195 | 010011011 |
| 004 | 001011110 | 068 | 010010011 | 132 | 110111001 | 196 | 010011110 |
| 005 | 001110011 | 069 | 010010101 | 133 | 110111010 | 197 | 010110011 |
| 006 | 001110110 | 070 | 010010110 | 134 | 110111111 | 198 | 010110110 |
| 007 | 010001001 | 071 | 010011010 | 135 | 111001011 | 199 | 011100011 |
| 008 | 010010010 | 072 | 010011111 | 136 | 111001110 | 200 | 011100110 |
| 009 | 010010111 | 073 | 010100101 | 137 | 111010011 | 201 | 100010010 |
| 010 | 010011101 | 074 | 010101001 | 138 | 111010101 | 202 | 100010111 |
| 011 | 010101011 | 075 | 010101010 | 139 | 111010110 | 203 | 100011101 |
| 012 | 010101110 | 076 | 010101111 | 140 | 111011010 | 204 | 100101011 |
| 013 | 010110101 | 077 | 010110010 | 141 | 111011111 | 205 | 100101110 |
| 014 | 010111010 | 078 | 010110111 | 142 | 111100101 | 206 | 100110101 |
| 015 | 010111111 | 079 | 010111011 | 143 | 111101001 | 207 | 100111010 |
| 016 | 011010011 | 080 | 010111101 | 144 | 111101010 | 208 | 100111111 |
| 017 | 011010110 | 081 | 010111110 | 145 | 111101111 | 209 | 101010011 |
| 018 | 011100101 | 082 | 011001001 | 146 | 111110010 | 210 | 101010110 |
| 019 | 011101010 | 083 | 011010001 | 147 | 111110111 | 211 | 101100101 |
| 020 | 011101111 | 084 | 011010010 | 148 | 111111011 | 212 | 101101010 |
| 021 | 011111011 | 085 | 011010111 | 149 | 111111101 | 213 | 101101111 |
| 022 | 011111110 | 086 | 011011101 | 150 | 111111110 | 214 | 101111011 |
| 023 | 100010001 | 087 | 011100010 | 151 | 001001001 | 215 | 101111110 |
| 024 | 100100010 | 088 | 011100111 | 152 | 001010010 | 216 | 110100011 |
| 025 | 100100111 | 089 | 011101011 | 153 | 001010111 | 217 | 110100110 |
| 026 | 100101101 | 090 | 011101101 | 154 | 001011101 | 218 | 111000101 |
| 027 | 100111001 | 091 | 011101110 | 155 | 001101011 | 219 | 111001010 |
| 028 | 101001011 | 092 | 011110101 | 156 | 001101110 | 220 | 111001111 |
| 029 | 101001110 | 093 | 011111001 | 157 | 001110101 | 221 | 111011011 |
| 030 | 101010101 | 094 | 011111010 | 158 | 001111010 | 222 | 111011110 |
| 031 | 101011010 | 095 | 011111111 | 159 | 001111111 | 223 | 111110011 |
| 032 | 101011111 | 096 | 100010011 | 160 | 010010001 | 224 | 111110110 |
| 033 | 101101001 | 097 | 100010110 | 161 | 010100010 | 225 | 001010011 |
| 034 | 101110010 | 098 | 100100011 | 162 | 010100111 | 226 | 001010110 |
| 035 | 101110111 | 099 | 100100101 | 163 | 010101101 | 227 | 001100101 |
| 036 | 101111101 | 100 | 100100110 | 164 | 010111001 | 228 | 001101010 |
| 037 | 110010011 | 101 | 100101010 | 165 | 011001011 | 229 | 001101111 |
| 038 | 110010110 | 102 | 100101111 | 166 | 011001110 | 230 | 001111011 |
| 039 | 110100101 | 103 | 100111011 | 167 | 011010101 | 231 | 001111110 |
| 040 | 110101010 | 104 | 100111110 | 168 | 011011010 | 232 | 010001101 |
| 041 | 110101111 | 105 | 101000101 | 169 | 011011111 | 233 | 010011001 |
| 042 | 110111011 | 106 | 101001001 | 170 | 011101001 | 234 | 010100011 |
| 043 | 110111110 | 107 | 101001010 | 171 | 011110010 | 235 | 010100110 |
| 044 | 111001001 | 108 | 101001111 | 172 | 011110111 | 236 | 010110001 |
| 045 | 111010010 | 109 | 101010010 | 173 | 011111101 | 237 | 011000101 |
| 046 | 111010111 | 110 | 101010111 | 174 | 101000111 | 238 | 011001010 |
| 047 | 111011101 | 111 | 101011011 | 175 | 101001101 | 239 | 011001111 |
| 048 | 111101011 | 112 | 101011101 | 176 | 101011001 | 240 | 011011011 |
| 049 | 111101110 | 113 | 101011110 | 177 | 101110001 | 241 | 011011110 |
| 050 | 111110101 | 114 | 101101011 | 178 | 110001011 | 242 | 011110011 |
| 051 | 111111010 | 115 | 101101110 | 179 | 110001110 | 243 | 011110110 |
| 052 | 111111111 | 116 | 101110011 | 180 | 110010101 | 244 | 100010101 |
| 053 | 001000111 | 117 | 101110101 | 181 | 110011010 | 245 | 100011010 |
| 054 | 001001011 | 118 | 101110110 | 182 | 110011111 | 246 | 100011111 |
| 055 | 001001101 | 119 | 101111010 | 183 | 110101001 | 247 | 100101001 |
| 056 | 001001110 | 120 | 101111111 | 184 | 110110010 | 248 | 100110010 |
| 057 | 001010101 | 121 | 110001001 | 185 | 110110111 | 249 | 100110111 |
| 058 | 001011001 | 122 | 110010001 | 186 | 110111101 | 250 | 100111101 |
| 059 | 001011010 | 123 | 110010010 | 187 | 111010001 | 251 | 101000110 |
| 060 | 001011111 | 124 | 110010111 | 188 | 111100010 | 252 | 101010001 |
| 061 | 001101001 | 125 | 110011101 | 189 | 111100111 | 253 | 101100010 |
| 062 | 001110001 | 126 | 110100010 | 190 | 111101101 | 254 | 101100111 |
| 063 | 001110010 | 127 | 110100111 | 191 | 111111001 | 255 | 101101101 |

DATA MODULATION METHOD, AND RECORDING AND REPRODUCING APPARATUSES AND METHODS ADOPTING THE DATA MODULATION METHOD

CROSS REFERENCE TO RELATED APPLICATIONS

This application claims the benefit of Korean Application No. 2001-5370 filed Feb. 5, 2001, in the Korean Patent Office, the disclosure of which is incorporated herein by reference.

BACKGROUND OF THE INVENTION

1. Field of the Invention

The present invention relates to a method of data modulation and an apparatus for and a method of recording data on and/or reproducing data from a recording medium, and more particularly, to a data recording and reproducing apparatus and method in which data are modulated to be resistant to channel distortion.

2. Description of the Related Art

With the increased recording density of recording media, track pitches of digital versatile disc random access memories (DVD-RAMs), recordable DVD (DVD-R), or DVD rewritable (DVD-RW) become narrow. Accordingly, introduction of crosstalk or noise from neighbor tracks and the amount of inter-symbol interference (ISI) from neighbor pits are increasing. This disturbance increases jitter of a radio frequency (RF) signal, particularly when a recording medium whose physical address is recorded as pits is accessed.

Run length limited (RLL) codes having limited maximum and minimum run lengths are common data modulation codes for recording media. The minimum run length, which is denoted by parameter "d", greatly affects accuracy in detecting pits (or lands) in an optical disc and the recording density of that code. The maximum run length, which is denoted by parameter "k", is associated with code efficiency and sync strategy. Common RLL codes include consecutive run lengths between the minimum and maximum run lengths "d" and "k". For example, eight-to-fourteen modulation plus (EFM+) codes compatible with DVD family recording media have d=2 and k=10, so 4T, 5T, . . . , 10T (where T=reproduction clock) codes, excluding a sync code, exist between a minimum pit (or land) length of 3T and a maximum pit length of 11T. FIG. 1 is a histogram of the run length distribution of the EFM+ codes. However, when jitter occurs in an RF signal being reproduced, due to any distortion in a channel, the 1T space codes of FIG. 1 increase the likelihood of error occurring at a deviation of ±0.5T.

FIG. 2 is a table of the physical address format in the header field of a general DVD-RAM. For the general DVD-RAM, the same address data are written twice to the header field for high detection performance. The physical address format includes variable frequency oscillator (VFO1) data for phase locked loop (PLL), address mark (AM) data, physical identification data (PID1), identification error detection data (IED1), and postamble data (PA1) for IED1 demodulation. VFO2, AM, PID2, IED2, and PA2, which have the same functions as VFO1, AM, PID1, IED1 and PA1, respectively, are also included in the address format. However, even though detection performance is improved, writing the physical address data based on this RLL modulation code causes a redundancy problem.

SUMMARY OF THE INVENTION

To solve the above-described problems, it is an object of the present invention to provide a method of data modulation which is resistant to disturbance and which improves recording density of recording media, and apparatuses for data recording and reproducing and methods adopting the disturbance-tolerant modulation method.

Additional objects and advantages of the invention will be set forth in part in the description which follows, and, in part, will be obvious from the description, or may be learned by practice of the invention.

To achieve the above and other objects of the present invention, there is provided an apparatus for modulating digitized data to be written to a recording medium. A space extending encoder performs a first code transformation to extend a run length of the digitized data to a predetermined length and outputs the space-extended data. A multiplexer multiplexes the space-extended data output from the space extending encoder and data transformed by a predetermined second code transformation. A format converter converts the data output from the multiplexer into a predetermined format which is suitable for writing to the recording medium.

Preferably, binary "1"s of the digitized data are transformed to "010" and binary "0"s are transformed to "000" by the first code transformation. The first code transformation is preferably performed to data belonging to a header region of the recording medium. Preferably, the data belonging to the header region comprises: an address mark indicating a start of an address; variable frequency oscillator (VFO) data which are used to generate synchronization (sync) signals; and address data. Preferably, the address data are modulated by a rate 8/9 modulation scheme before being input to the space extending encoder, the second code transformation is performed to user data by an eight-to-fourteen modulation plus (EFM+) scheme and the format converter converts a non-return-to-zero (NRZ) data format to a non-return-to-zero-inverse (NRZI) data format.

To achieve the above and other objects of the present invention, there is provided an apparatus for demodulating data read from a recording medium wherein a run length of the data is extended by a predetermined length by modulation. A detection unit detects the data from the recording medium. An error correction unit corrects errors from the detected data and a decoder decodes the error-corrected data by reducing the run length of the data extended through the modulation by the predetermined length to recover the original data bits.

Preferably, the data demodulating apparatus further comprises a synchronization (sync) detector which distinguishes data extended by a predetermined length from other data. Preferably, where the data written to the recording medium is modulated from binary "1"s to "010" and binary "0"s to "000", the error correction unit corrects data in the form of "1xx", "x1x", and "xx1" to "010". The decoder preferably decodes data "010" to "1" and data "000" to "0".

To achieve the above and other objects of the present invention, there is provided an apparatus for recording data including header and user data in a recording medium. A first encoder encodes the header data by extending a run length of the header data through a first code transformation. A second encoder encodes the user data through a second code transformation. A multiplexer multiplexes the transformed data output from the first and second encoders. A format converter converts the multiplexed data output from the multiplexer into a format suitable for writing to the recording medium and a pulse shaping unit shapes pulses of the data output from the format converter to write the resultant data to the record medium.

Preferably, binary "1"s of the header data are transformed to "010" and binary "0"s are transformed to "000" by the first code transformation.

To achieve the above and other objects of the present invention, there is provided an apparatus for demodulating data read from a recording medium, the data including header and user data being transformed by first and second code transformations, respectively. A detection unit detects the data from the recording medium and digitizes the detected data. A synchronization detector detects a sync signal from the header data. A first error correction unit corrects errors from the header data of the digitized data in synchronization with the sync signal detected by the sync detector. A first decoder decodes the error-corrected header data by a first decoding scheme. A second decoder decodes the user data of the digitized data by a second decoding scheme. An address decoder decodes address data of the header data decoded by the first decoder and a second error correction unit corrects errors from the user data decoded by the second decoder.

Preferably, where the header data written to the recording medium is modulated from binary "1"s to "010" and binary "0"s to "000", the first error correction unit corrects data in the form of "1xx", "x1x", and "xx1" to "010", and data of "000" to "0". Preferably, the first decoder decodes the error-corrected data "010" and data "000" from the first error correction unit to binary "1" and binary "0", respectively.

To achieve the above and other objects of the present invention, there is provided a method of recording data in a recording medium, the method comprising; distinguishing header data from user data; performing a first code transformation to the header data by extending the run length of the header data coded with run length limited (RLL) codes; performing second code transformation to the user data; multiplexing the header data transformed by the first code transformation and the user data transformed by the first code transformation; converting the multiplexed data into a predetermined format suitable for writing to the recording medium; and writing the converted data to the recording medium.

Preferably, binary "1"s of the header data are transformed to "010" and binary "0"s are transformed to "000" by the first code transformation.

To achieve the above and other objects of the present invention, there is provided a method of reproducing data written to a recording medium, the method comprising: detecting and digitizing the data written to the recording medium; converting the digitized data to a predetermined demodulation format; classifying the format-converted data into header data and user data; correcting errors from the header data; decoding the error-corrected header data by a first decoding scheme; restoring address data from the decoded header data; decoding the user data by a second decoding scheme; and correcting errors from the decoded user data.

Preferably, in the correction of errors from the header data, where the header data written to the recording medium is modulated from binary "1"s to "010" and binary "0"s to "000", data in the form of "1xx", "x1x", and "xx1" are corrected to "010". Preferably, in the decoding of the error corrected header data by a first decoding scheme, the data "010" and data "000" are corrected to "1" and "0", respectively.

The present invention also provides a method of run length limited (RLL) modulation applied to data to be written to a recording medium using an RLL (d, k, m, n, s) code, where d is a minimum run length, k is a maximum run length, m is a data bit length before modulation, n is a codeword bit length after modulation, and s is a space length between codewords, wherein the RLL modulation method uses the RLL code with s=2 or greater for pits or lands of the recording medium shorter than a predetermined level, and uses the RLL code with s=1 for other pits or lands of the recording medium.

BRIEF DESCRIPTION OF THE DRAWINGS

The above objects and advantages of the present invention will become more apparent by describing in detail preferred embodiments thereof with reference to the attached drawings in which:

FIG. 1 is a histogram of a run length distribution of EFM+ codes;

FIG. 2 is a table of a physical address format in a header field of a general digital versatile disc random access memory (DVD-RAM);

FIGS. 6A–6E show waveforms of data flow in the apparatus of FIG. 5;

FIG. 11A is a table illustrating the header structure formed using the space-extended code according to the present invention where the data are written once;

FIG. 11B is a table illustrating the header structure formed using the space-extended code according to the present invention where the data are written twice;

FIG. 16 is an example of a modulation code table for a rate 8/9 modulator of the data recording and reproducing apparatus of FIG. 5.

DESCRIPTION OF THE PREFERRED EMBODIMENTS

Figure 3:
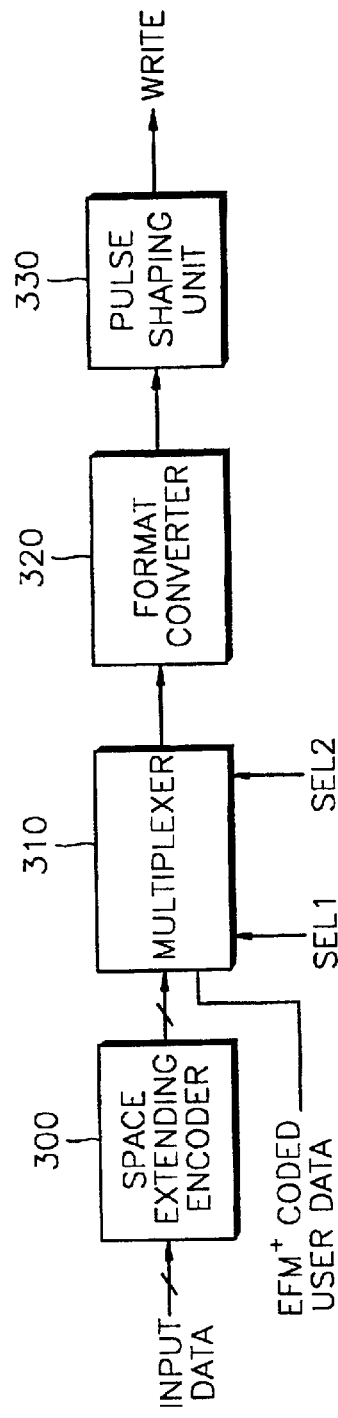
FIG. 3 is a block diagram of an embodiment of an apparatus for data recording according to the present invention.

Reference will now be made in detail to the present embodiments of the present invention, examples of which are illustrated in the accompanying drawings, wherein like reference numerals refer to like elements throughout.

An embodiment of a data recording apparatus according to the present invention is shown in FIG. 3. Referring to FIG. 3, the data recording apparatus comprises a space extending encoder 300, a multiplexer 310, a format converter 320, and a pulse shaping unit 330. Where digitized data are input to be written to a recording medium, the space extending encoder 300 extends the run length of the digitized data by a predetermined length through a first code transformation. The first code transformation is performed to reduce errors in detecting the digitized data from the recording medium. Through the first code transformation, the digitized data are modulated such that 2T or more spaces are formed between pits, where T is a basic reproduction clock. The codes spaced 2T or 3T between pits improve detection performance against jitter, compared with 1T spaced codes. Although the codes spaced 2T or 3T between pits are disadvantageous in terms of recording density due to the increased code length, the 2T or 3T spaced codes are effective for information such as a physical address written on a disc, in terms of improved detection performance with reduced errors in the presence of jitter. Based on the concept of the space extension described above, the space extending encoder 300 modulates a binary "1" of the input data to "010" and a binary "0" to "000". The data input to the space extending encoder 300 correspond to data to be written to physical address regions which are susceptible to error and will be referred to herein as "header data". Header data includes an address mark (AM) signal, a variable frequency oscillator (VFO) signal, and address data. The VFO and AM signals have a predetermined pattern. The address data may be data codes that have undergone a rate 8/9 modulation before being input to the space extending encoder 300. The VFO signals are for synchronization by a phase-locked loop (PLL), and address marks indicate the start of address. Unlike the header data, user data are transformed by a second code transformation, such as EFM+.

The multiplexer 310 multiplexes the code-transformed header data from the space extending encoder 300 and the second-code transformed user data, and outputs the multiplexed results. The multiplexer 310 receives the header data and the user data in response to a combination of external select signals SEL1 and SEL2. The VFO signal, AM signal, address data stream, and user data stream are sequentially multiplexed and output through the multiplexer 310. The format converter 320 converts the data stream output from the multiplexer 310 to a suitable format used for writing to the recording medium. For example, where the data stream is output from the multiplexer 310 in a non-return-to-zero (NRZ) format, the NRZ data stream is converted to a non-return-to-zero-inverse (NRZI) format. The pulse shaping unit 330, which may be implemented by a laser power controller (LPC), writes the data stream output from the format converter 320 to the recording medium (not shown). For preparing a recordable recording medium, only header data are written while a user data region remains blank.

Figure 4:
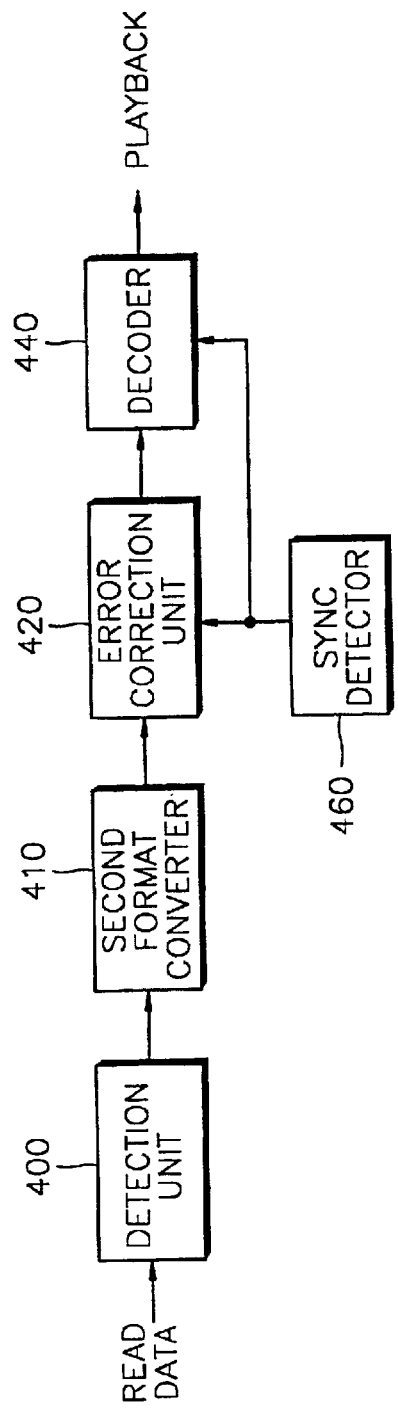
FIG. 4 is a block diagram of an embodiment of an apparatus for reproducing data written to a recording medium by the data recording apparatus of FIG. 3.

FIG. 4 is a block diagram for an apparatus for reproducing data which has been written to the recording medium by the data recording apparatus of FIG. 3. The data reproducing apparatus includes a detection unit 400, an error correction unit 420, and a decoder 440. The detection unit 400 digitizes data read from the recording medium. The error correction unit 420 corrects errors existing in the data digitized by the detection unit 400, which are caused by distortion such as jitter. Because the data written by the recording apparatus of FIG. 3 are modulated through space expansion to "010" for a binary "1" and "000" for a binary "0", the error correction unit 420 corrects data codes in the form of "1xx", "x1x", and "xx1" to "010". The data reproducing apparatus may further include a format converter 410 between the detection unit 400 and the error correction unit 420 for converting, for example, the NRZI data stream back to the original NRZ format. The decoder 440 decodes the error-corrected data from the error correction unit 420. The decoder 440 decodes the error-corrected data by reducing the run length extended by the space-extending encoding to recover the original data bits: "010" to "1" and "000" to "0". To allow the decoder 400 to identify separate data codewords to be decoded from the successive data stream, a synchronization (sync) detector 460 is used. The sync detector 460 detects input VFO and AM signals, which have a predetermined pattern, and generates sync pulses to identify data codewords from the data stream. For example, if the address data stream incoming after the VFO and AM signals is "000100000010001 000 . . . ", the sync detector 460 generates a 1-bit sync signal in synchronization with every second bit of the codewords "000", "100", "000", "010", "001", and "000". The error correction unit 420 performs error correction to the codewords "000", "100", "000", "010", "001", and "000" to output codewords "000", "010", "000", "010", "010", and "000", respectively, in response to the sync signals (or sync pulses).

Figure 5:
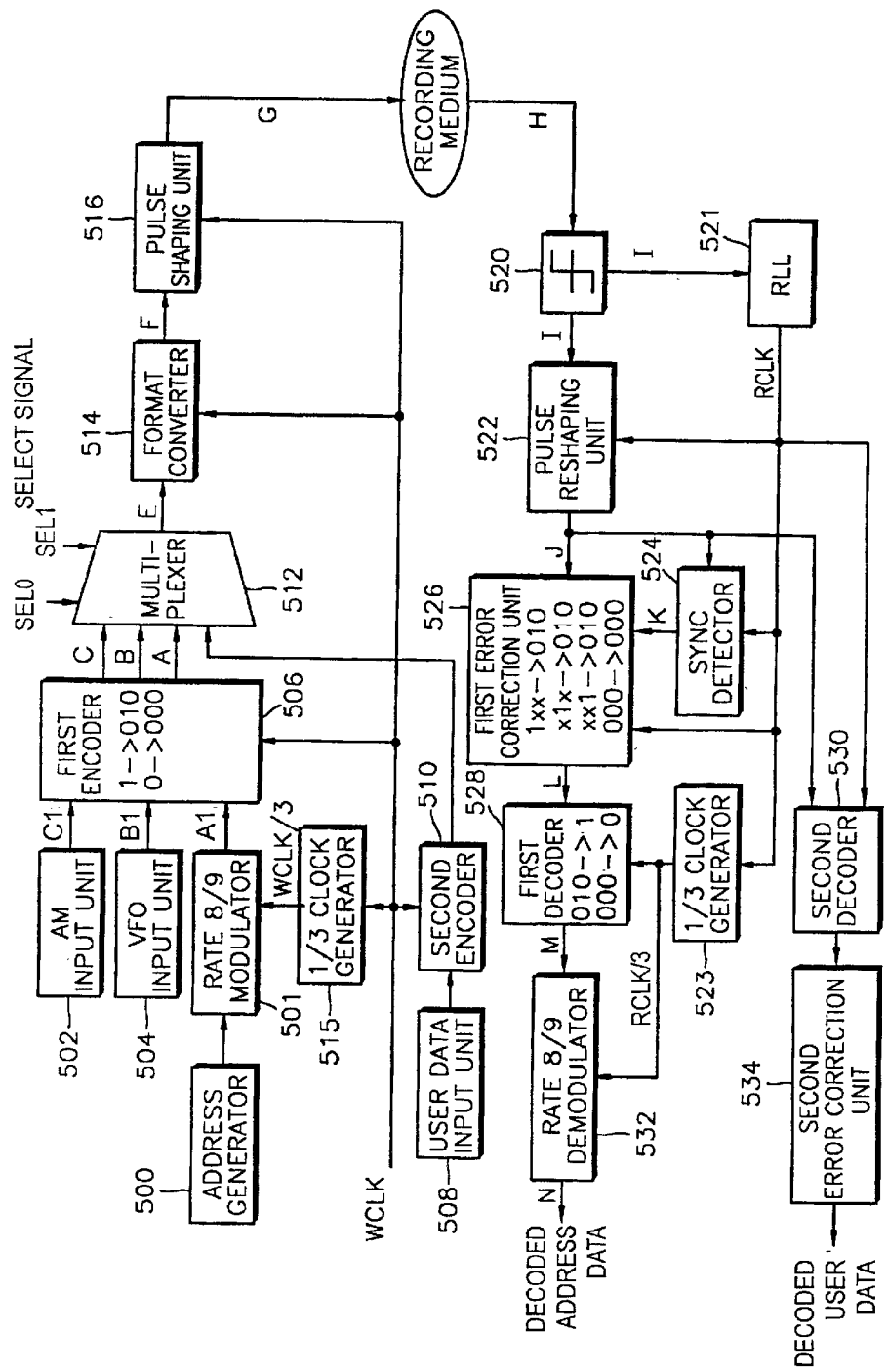
FIG. 5 is a detailed block diagram of an apparatus for recording and reproducing data according to the present invention.

FIG. 5 is a detailed block diagram of a data recording and reproducing apparatus according to the present invention. A recording part of the apparatus includes an address generator 500, an AM input unit 502, a VFO input unit 504, a first encoder 506, a user data input unit 508, a second encoder 510, a multiplexer 512, a format converter 514, and a pulse shaping unit 516. The header and user data are separately encoded by different encoding schemes. The VFO and AM signals, which are included in the header data, are input to the first encoder 506 through the VFO input unit 504 and the AM input unit 502, respectively. Address data are generated by the address generator 500, encoded by a rate 8/9 modulator 501, and input to the first encoder 506. The user data is input to the second encoder 510, which employs, for example, the EFM+ encoding scheme, through the user data input unit 508. The first encoder 506 performs space-extending encoding to increase the run lengths of the header data. The run length extending encoding is performed by encoding binary "1"s of the input data stream to "010" and binary "0"s to "000".

The multiplexer 512 multiplexes the header data encoded by the first encoder 506 and the user data encoded by the second encoder 510. The format converter 514 converts the multiplexed data to a suitable data pattern to be written to a recording medium. The format converter 514 converts the NRZ data stream output from the multiplexer 512 to an NRZI format. The pulse shaping unit 516 performs pulse shaping to the data stream output from the format converter 514 and writes the resultant data to the recording medium. The recording part also includes a 1/3 clock generator 515 for generating a clock edge at a rate of 1/3 times the rate of a write clock WCLK, to induce the operations of the rate 8/9 modulator 501, the first encoder 506, the second encoder 510, the format converter 514, and the pulse shaping unit 516.

A reproducing part of the data recording and reproducing apparatus of FIG. 5 includes a data detector 520, a pulse reshaping unit 522, a sync detector 524, a first error correction unit 526, a first decoder 528, a second decoder 530, a rate 8/9 demodulator 532, and a second error correction unit 534. The data detector 520 reads data from the recording medium and digitizes the read data. The pulse reshaping unit 522 converts the digitized data to the original format, i.e., an NZRI data stream to an NZR format. The sync detector 524 detects known predetermined patterns of the VFO and AM signals output from the pulse reshaping unit 522 and generates sync pulses K to classify each address data from the data stream and generates a sync pulse at every classified data. For example, if the address data stream incoming after the VFO and AM signals is "000100000010001000", the sync detector 524 generates a 1-bit sync signal in synchronization with every second bit of the classified data "000", "100", "000", "010", "001", and "000". The first error correction unit 526 corrects data in the form of "1xx", "x1x", and "xx1" to "010" in synchronization with the sync pulses K generated by the sync detector 524 to output a signal L. The first decoder 528 decodes the error-corrected data by reducing the extended run length to recover the original data bits. The first decoder 528 decodes the error-corrected codewords "000", "010", "000", "010", "010", and "000"to "1", "0", "1", "1", and "0" bits, respectively to output a signal M. The second decoder 530 performs decoding of user data. The second decoder 530 performs EFM+ demodulation on the EMF+-modulated user data and outputs the demodulated user data. The address data of the header data demodulated by the first decoder 528 is restored to the original address data through the rate 8/9 demodulator 532. A phase locked loop circuit (PLL) 521 generates a read clock signal RCLK and a 1/3 clock generator 523 generates a clock (RCLK/3) at a rate of 1/3 times the rate of the read clock RLCK.

Figure 7A:
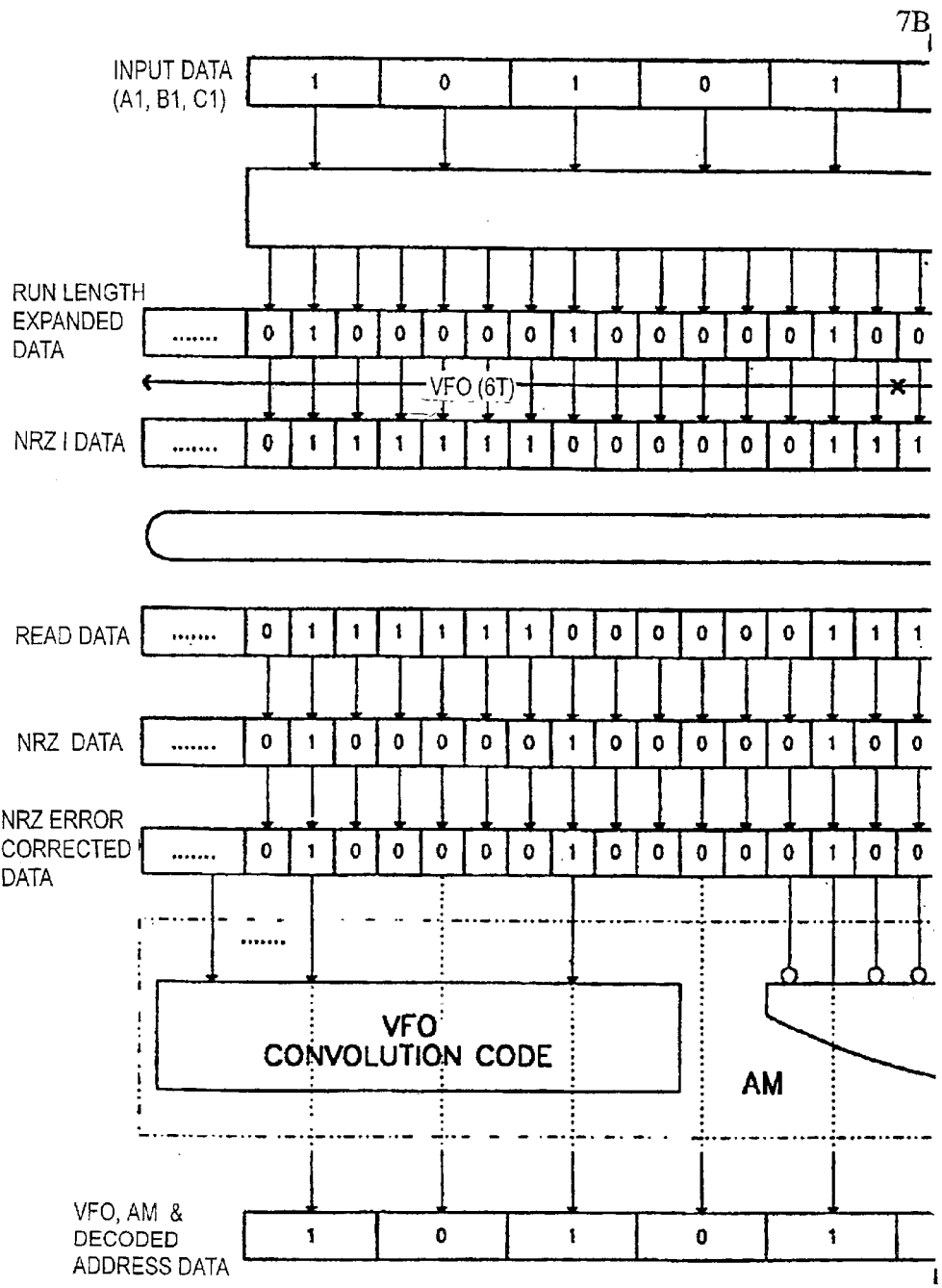
FIG. 7A is a first partial view of a flow diagram, which illustrates examples of signals output from the elements of the data recording and reproducing apparatus of FIG. 5.
Figure 7B:
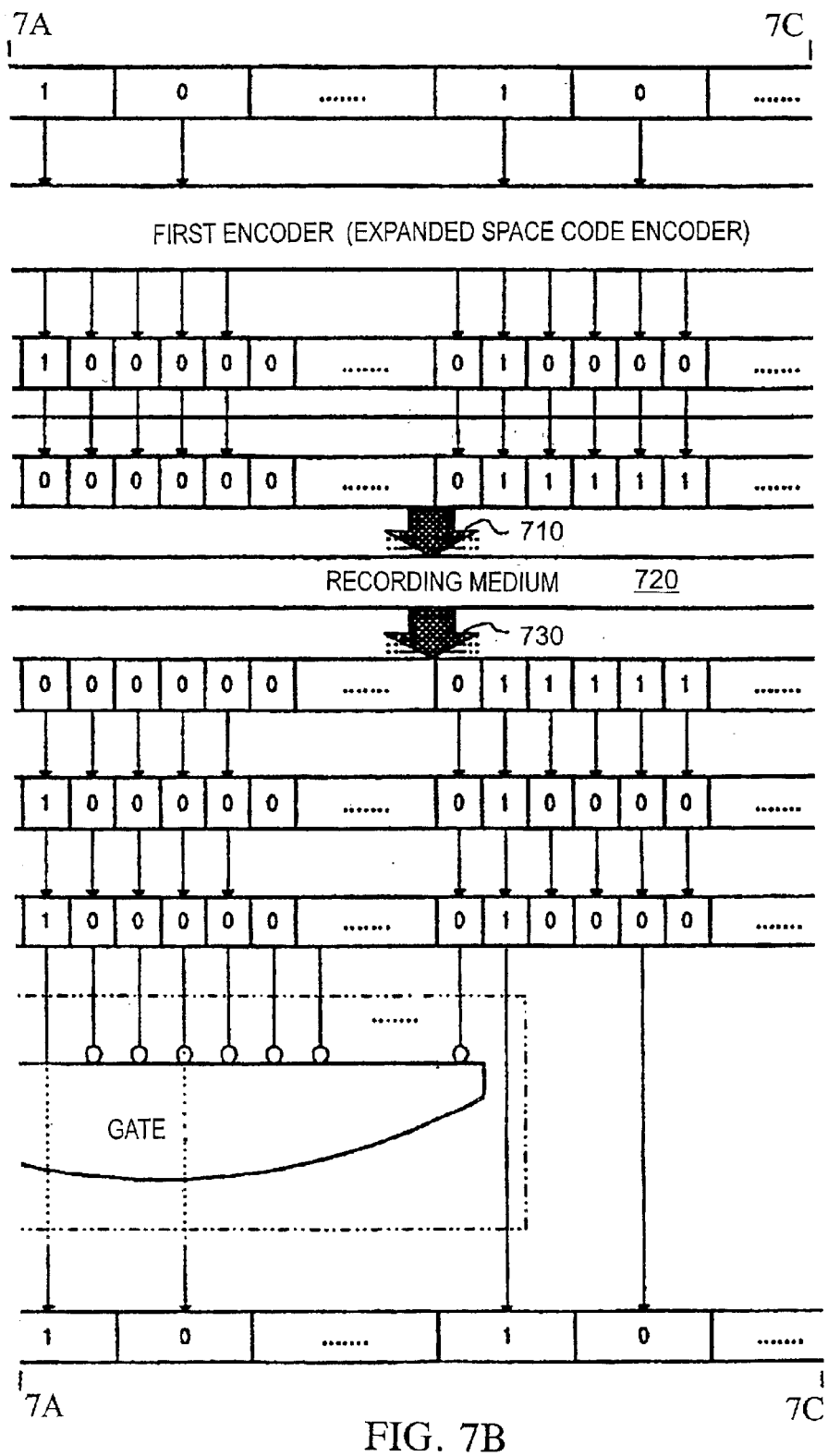
FIG. 7B is a second partial view of a flow diagram, which illustrates examples of signals output from the elements of the data recording and reproducing apparatus of FIG. 5, and which is joined with FIG. 7A by joining line 7B—7B in FIG. 7A along line 7A—7A in FIG. 7B.
Figure 7C:
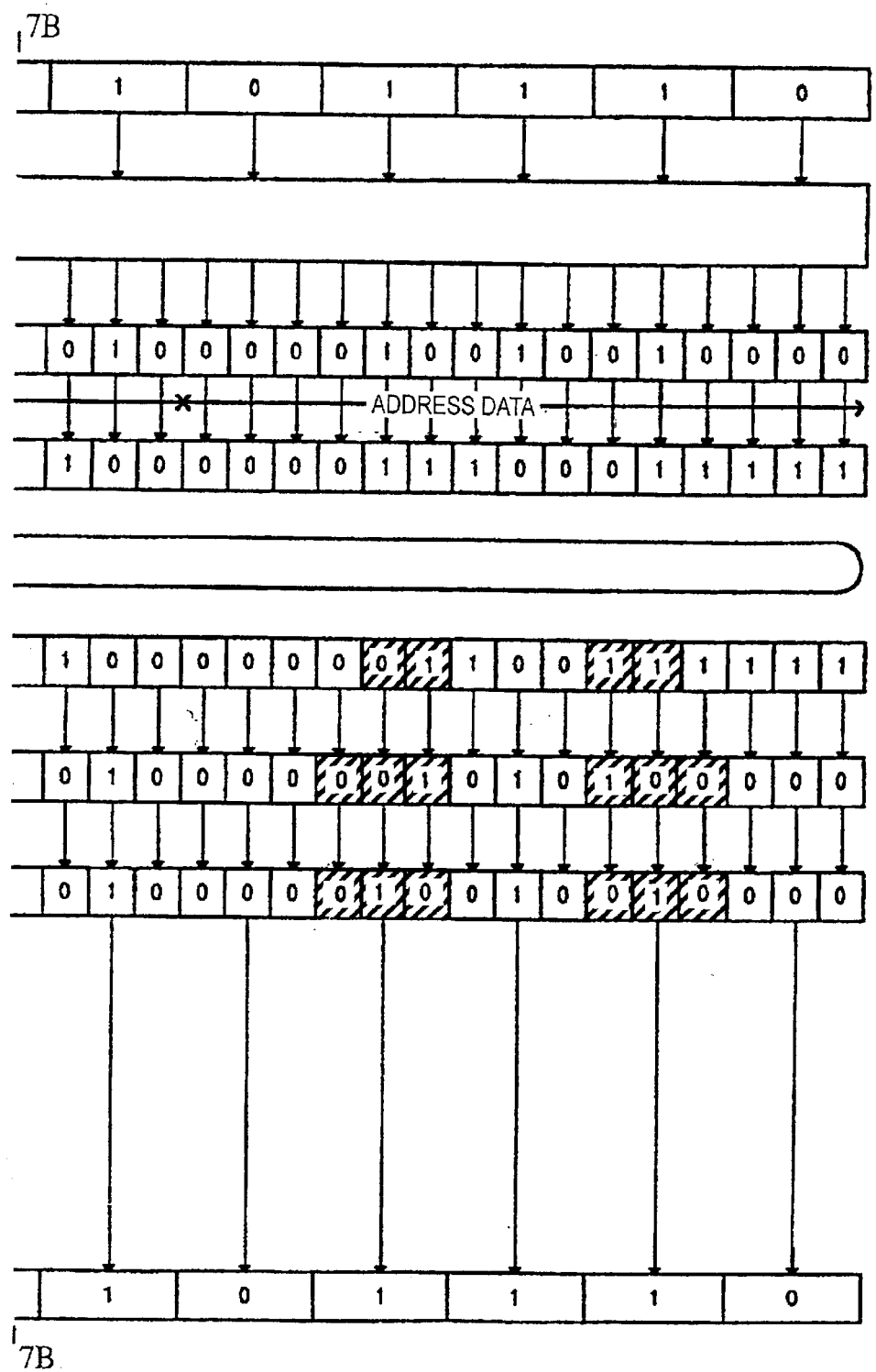
FIG. 7C is a third partial view of a flow diagram, which illustrates examples of signals output from the elements of the data recording and reproducing apparatus of FIG. 5, and which is joined with FIG. 7B by joining line 7C—7C in FIG. 7B along the line 7B—7B in FIG. 7C.

FIGS. 6A–6E are waveforms of data of FIG. 5. FIG. 6A represents the VFO signals, FIG. 6B represents the AM signals, FIG. 6C represents the address data, FIG. 6D represents the entire header data, and FIG. 6E represents the signals for selecting signals (SEL0, SEL1) input to the multiplexer 512 of FIG. 5. Although the user data are not illustrated in FIGS. 6A–6E, the user data are included in the low interval ("0") between the header data. The select signals (corresponding to the waveform of FIG. 6E) for the multiplexer 512 are obtained by the waveforms in FIGS. 6A through 6D. In the waveform of the select signals shown in FIG. 6E, interval 0 is for user data selection, interval 1 is for VFO signal selection, interval 2 is for AM signal selection, and interval 3 is for address data selection. The interval numbers (0, 1, 2 and 3) in the waveform of FIG. 6E correspond to values combined by a two-bit select signal of the multiplexer 510.

Where combined along the lines indicated to form an entire diagram, FIGS. 7A, 7B and 7C show examples of the signals output from elements of the data recording and reproducing apparatus of FIG. 5. INPUT DATA (A1, B1, C1) for address data, VFO and AM, correspond to signals A1, B1 and C1, respectively, of FIG. 5. The INPUT DATA are encoded through run length expansion by the first encoder 506 to RUN LENGTH EXPANDED DATA, which corresponds to signal E of FIG. 5. The RUN LENGTH EXPANDED DATA are converted to an NRZI format by the format converter 514 of FIG. 5 to provide NRZI DATA as shown in FIGS. 7A, 7B and 7C, which corresponds to signal F of FIG. 5. Arrow 710 represents further processing such as pulse shaping by the pulse shaping unit 516 and subsequent writing the NRZI DATA to the recording medium 720. Arrow 730 represents acquiring the signal H of FIG. 5 from the recording medium 720 and digitizing the signal H with the data detector 520 to generate the signal I of FIG. 5. In the example shown, the READ DATA (signal I of FIG. 5) includes errors (expressed by hatching) caused by disturbance, such as jitter. The data I (FIG. 5) are converted from NRZI write data format to an NRZ data stream (signal J of FIG. 5) by the pulse reshaping unit 522 of FIG. 5. The NRZ data I are error corrected by the first error correction unit 526 to output NRZ ERROR CORRECTED DATA (signal L of FIG. 5). The VFO, AM & DECODED ADDRESS DATA includes an ADDRESS DATA portion which is decoded by the first decoder 528 and demodulated by the rate 8/9 demodulator of FIG. 5. The DECODED ADDRESS DATA portion corresponds to the signal N of FIG. 5.

The blocks labeled VFO CONVOLUTION CODE and GATE are functions included in the sync detector 524 of FIG. 5. The VFO and AM signals are determined to have a predetermined pattern of run lengths before being written. Thus, the VFO and AM signals are discriminated in reading by detecting the predetermined pattern of the signals from the read data stream. "VFO convolution" is for indicating the pattern of a data stream and detects a signal having a most frequent run length. The VFO signal is written as a 6T pattern and is discriminated in reading by detecting that pattern from the encoded data stream. The AM signal is also distinguished in reading by detecting the AM signal's particular write pattern using a predetermined logic gate. In the present invention, the AM signal is written as a 15T pattern and is discriminated by detecting that pattern in reading from the encoded data stream. Once the AM and VFO signals are discriminated, as can be inferred from the write data sequence of the multiplexer 512 shown in FIG. 6E, the data stream following the AM and VFO signals is detectable as address data. Sync pulses are generated in synchronization with every effective bit to be decoded in the same unit as the decoded unit for the following data stream after detecting AM, thereby accurately discriminating each data codeword and decoding the effective bits to be decoded.

Figure 8:
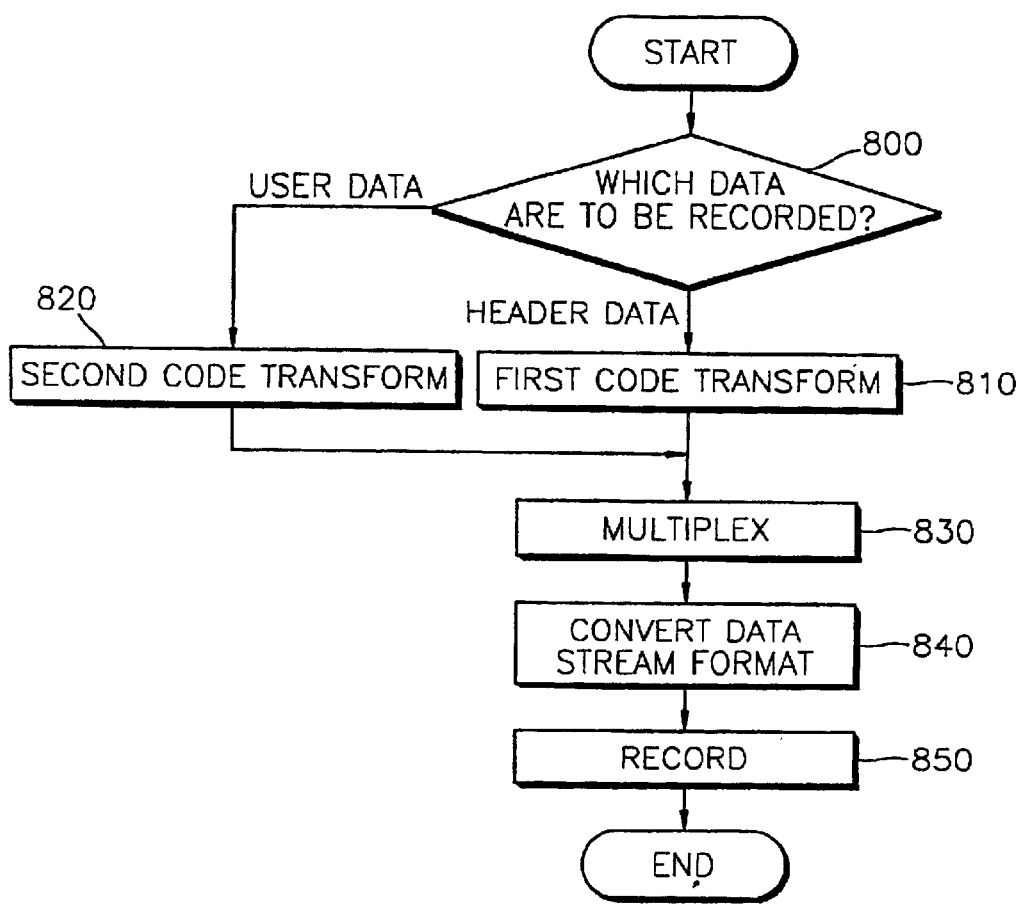
FIG. 8 is a flowchart illustrating a data recording method according to the present invention.

FIG. 8 is a flowchart illustrating a data recording method according to the present invention. First, it is discriminated in operation 800 whether data to be recorded are header data or user data. If the data to be recorded is RLL-encoded header data, a first code transformation is performed to the header data in operation 810. The first code transformation may be the space-extending coding as described above. That is, the run length of the data is extended by transforming binary "1"s of the data stream to "010" and binary "0"s to "000". If the data to be written is user data, second code transformation such as EFM+ transformation is performed on the user data in operation 820. The transformed header data (first code) and user data (second code) are multiplexed into a single data stream in operation 830. The multiplexed data stream is converted in operation 840 to a suitable format to be recorded in a recording medium. For example, the multiplexed data stream may be converted to a NRZI format. The format converted NRZI data stream is recorded in the recording medium in operation 850.

Figure 9:
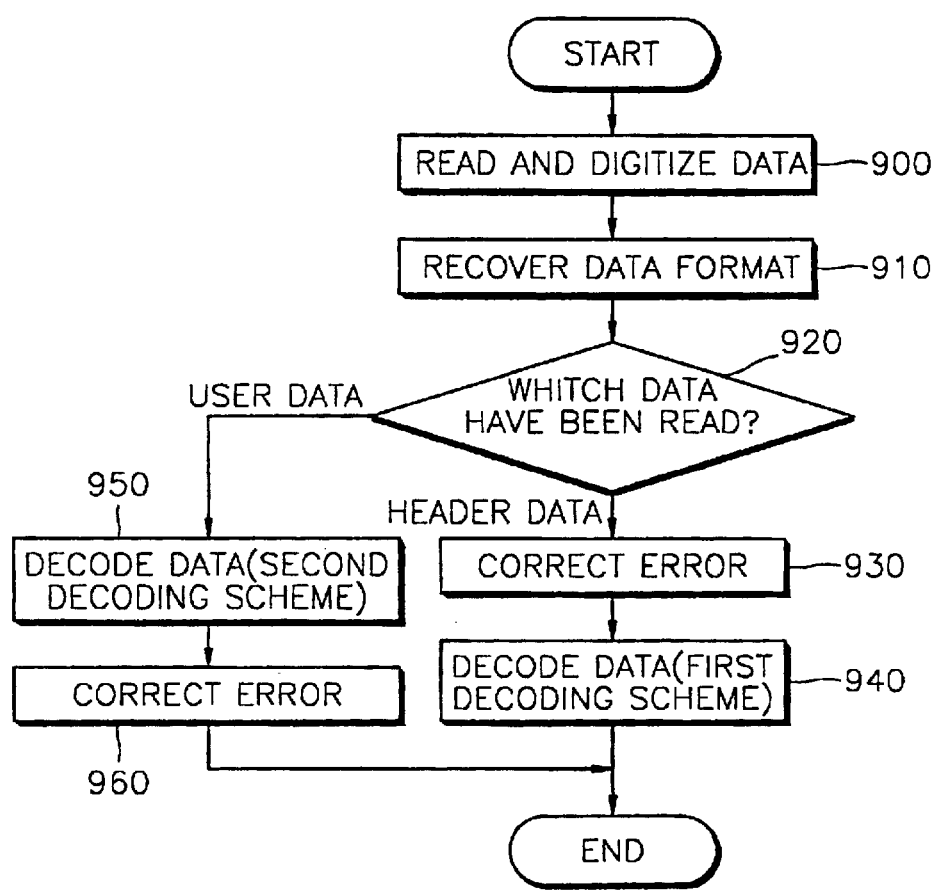
FIG. 9 is a flowchart illustrating a data reproducing method according to the present invention.

FIG. 9 is a flowchart illustrating a method of reproducing data written to the recording medium by the method described in reference to FIG. 8. First, the data are read from the recording medium and digitized in operation 900. Where the digitized data has undergone conversion to a predetermined format used for writing, another format conversion is performed to convert the read digitized signal to the original format in operation 910. Then, a determination is made whether the data stream converted to the original format is header data or user data in operation 920. Next, the header data are error corrected in operation 930. Where binary "1"s of the header data have been encoded to "010" and binary "0"s have been encoded to "000" before being written to the recording medium, the read data may include codewords "1xx", "x1x", or "xx1" caused by distortion. The distorted codewords are corrected to "010", to perform error correction. The error-corrected header data are decoded by a first decoding scheme to recover the original address data operation 940. In particular, the error-corrected data are decoded by reducing the run length of the data extended in writing the data to the recording medium, to recover the original data. That is, the data "000" and "010" are recovered to "0" and "1", respectively, through decoding. The user data are decoded by a second decoding in operation 950, and the decoded user data are error corrected in operation 960.

Figure 10A:
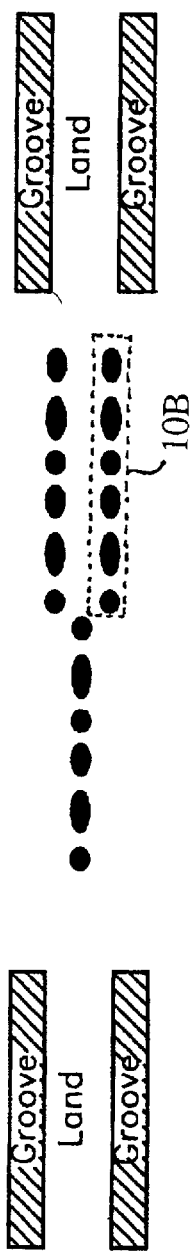
FIG. 10A shows an example of the data structure in the header of a conventional recordable optical disc-type recording and reproducing medium.
Figure 10B:
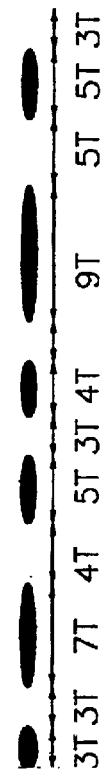
FIG. 10B is an enlarged view of a portion of FIG. 10A.

FIG. 10A shows an example of a physical structure of a conventional header of a recordable optical disc-type recording and reproducing medium which is formed with general RLL codes. FIG. 10B is an enlarged view of a portion of the physical structure shown in FIG. 10A. As shown in FIG. 10B, the conventional header consists of many kinds of 1T space signal patterns longer than 3T.

Figure 10C:
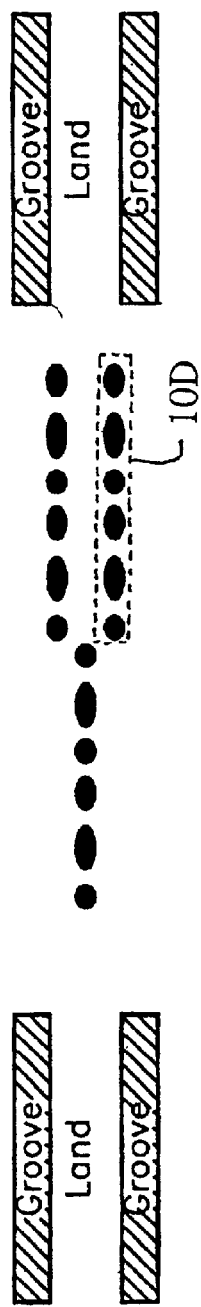
FIG. 10C shows an example of the data structure in the header of a recordable optical disc-type recording and reproducing medium according to the present invention.
Figure 10D:
FIG. 10D is an enlarged view of a portion of FIG. 10C.

FIG. 10C is an example of a physical structure of a header formed with the space-extended RLL code according to the present invention. As shown in FIG. 10D, the space-extended RLL code according to the present invention only consists of 3T, 6T, 9T, and 12T (12T signal pattern not shown in FIG. 10D) signal patterns.

FIGS. 11A and 11B are tables showing examples of the header structure formed with the space-extended code according to the present invention. FIG. 11A is an example of address data and related data where each of the address data and the related data are written once. FIG. 11B is an example of address data and related data where each of the address data and the related data are written twice.

Figure 12A:
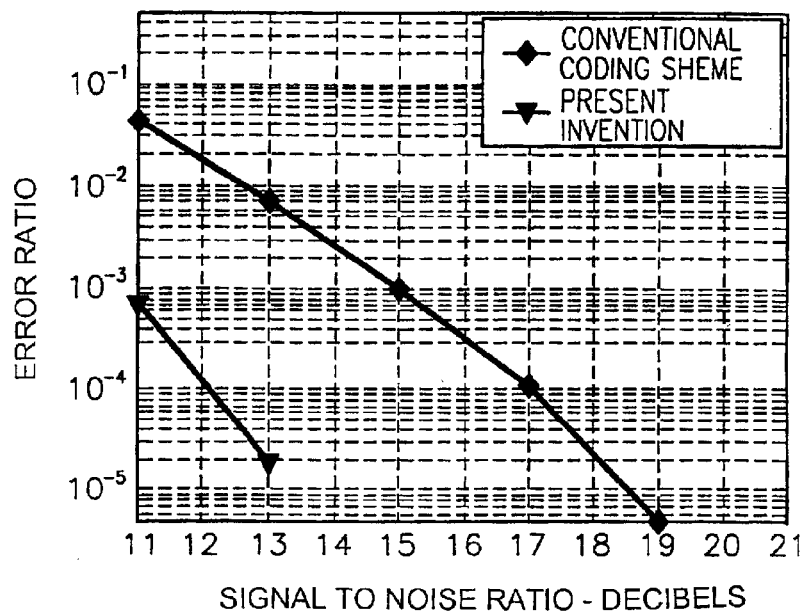
FIG. 12A is a graph comparing read error rate with respect to variations in signal-to-noise ratio (SNR) for the address data read from the conventional header field and the header field illustrated in FIG. 11A coded by the present invention.
Figure 12B:
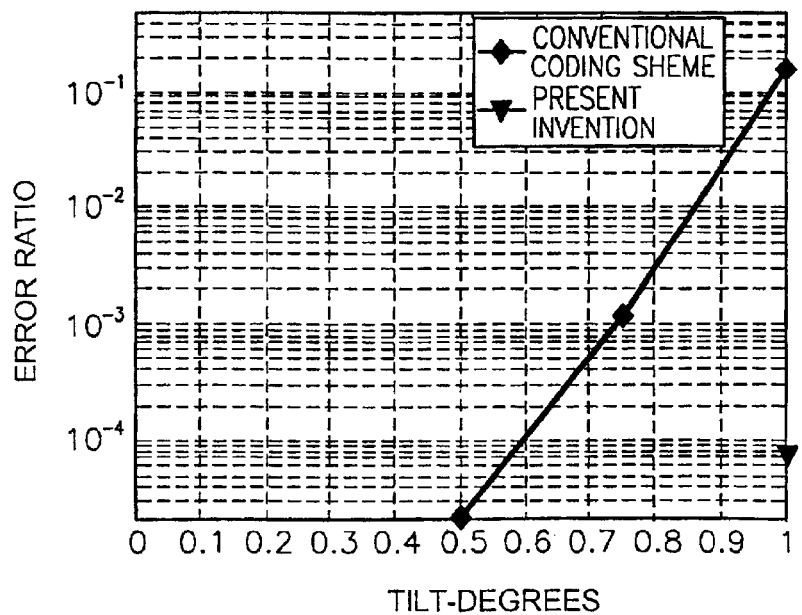
FIG. 12B is a graph comparing read error rate with respect to variations in tilt, for the address data read from the conventional header field and the header field illustrated in FIG. 11A coded by the present invention.
Figure 13A:
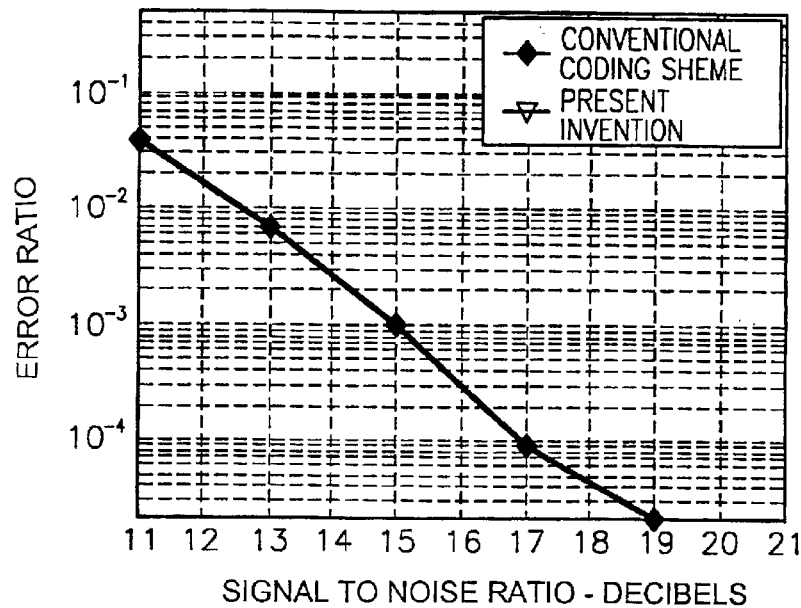
FIG. 13A is a graph comparing read error rate with respect to variations in SNR for the address data read from the conventional header and the header field of FIG. 11B coded by the present invention.
Figure 13B:
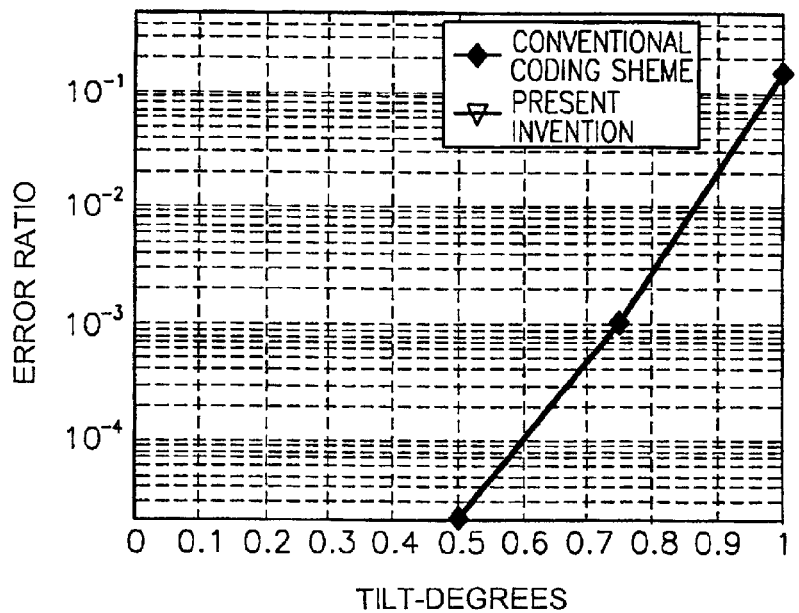
FIG. 13B is a graph comparing read error rate with respect to variations in tilt, for the address data read from the conventional header field and the header field illustrated in FIG. 11B coded by the present invention.

FIGS. 12A and 12B are graphs illustrating a comparison of read error ratio with respect to variations in signal-to-noise ratio (SNR) and with respect to variations in tilt, respectively, where the address data are read from the conventional header field having the format illustrated in FIG. 2 and the header field illustrated in FIG. 11A coded by the present invention. FIGS. 13A and 13B are graphs illustrating a comparison of read error ratio with respect to variations in signal-to-noise ratio (SNR) in decibels and with respect to variations in tilt, respectively, where the address data are read from the conventional header field having the format of FIG. 2 and the header field illustrated in FIG. 11B coded by the present invention. Data of error ratios on address data according to the present invention ($\triangledown$) are not shown in FIGS. 12A and 13B because the error ratio according to the present invention is believed to be at a zero level, that is, much less than the lowest value which can be plotted on the vertical axes of FIGS. 13A and 13B.

Figure 14A:
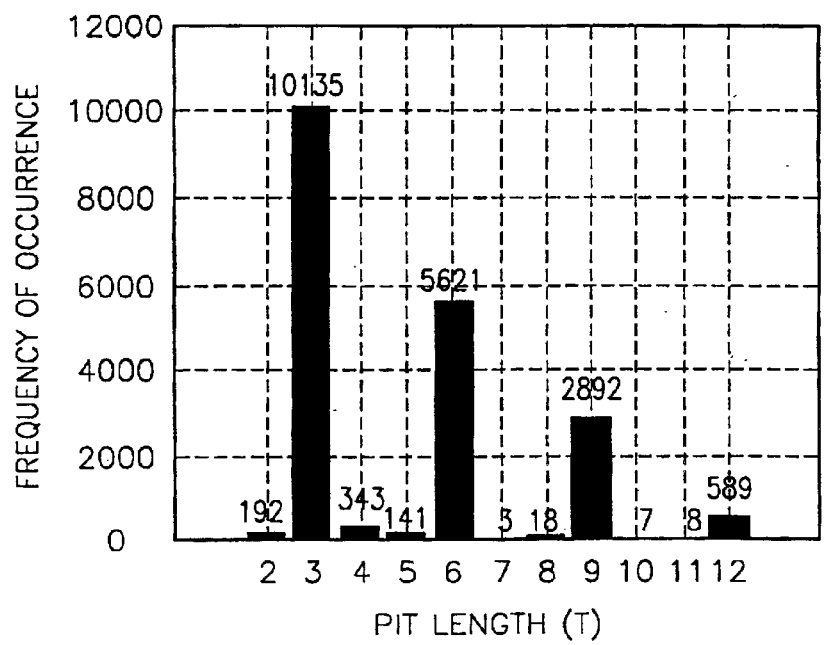
FIG. 14A is a histogram illustrating a frequency of occurrence of each pit length (T) immediately after digitizing signals in the header region according to the present invention.
Figure 14B:
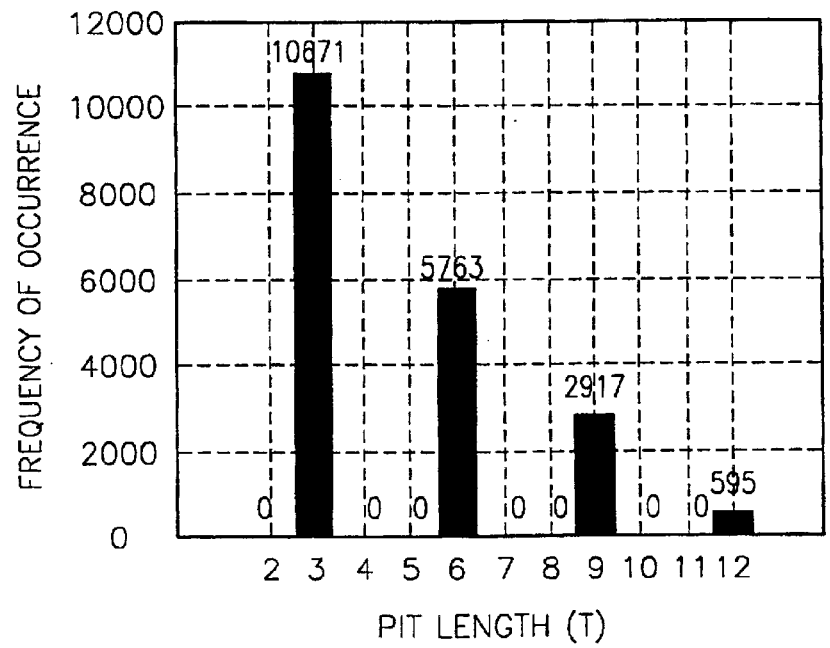
FIG. 14B is a histograms illustrating a frequency of occurrence of each pit length (T) after error correction of the digitized signals according to the present invention.

FIGS. 14A and 14B are histograms illustrating a frequency of occurrence of each pit length (T) immediately after digitizing the header data and after error correction, respectively, according to the present invention. As shown in FIG. 14B, 2T, 4T, 5T, 7T, 8T, 10T, and 11T patterns, which are not used, fully disappear through the error correction.

Where the above-described RLL modulation (which is expressed as RLL (d, k, m, n, s), where d is minimum run length, k is maximum run length, m is the data bit length before modulation, n is the codeword bit length after modulation, and s is the space length between codeword) is applied to write the header data to a recording medium, the RLL modulation is selectively applied depending on pit or land length of the recording medium. For example, a RLL (d, k, m, n, s) modulation code with s=2 or greater is applied to pits or lands of the recording medium shorter than a predetermined pit length, and a RLL (d, k, m, n, s) modulation code with s=1 is applied to pits or lands of the recording medium other than pits or lands which are shorter than the predetermined pit length.

Figure 15:
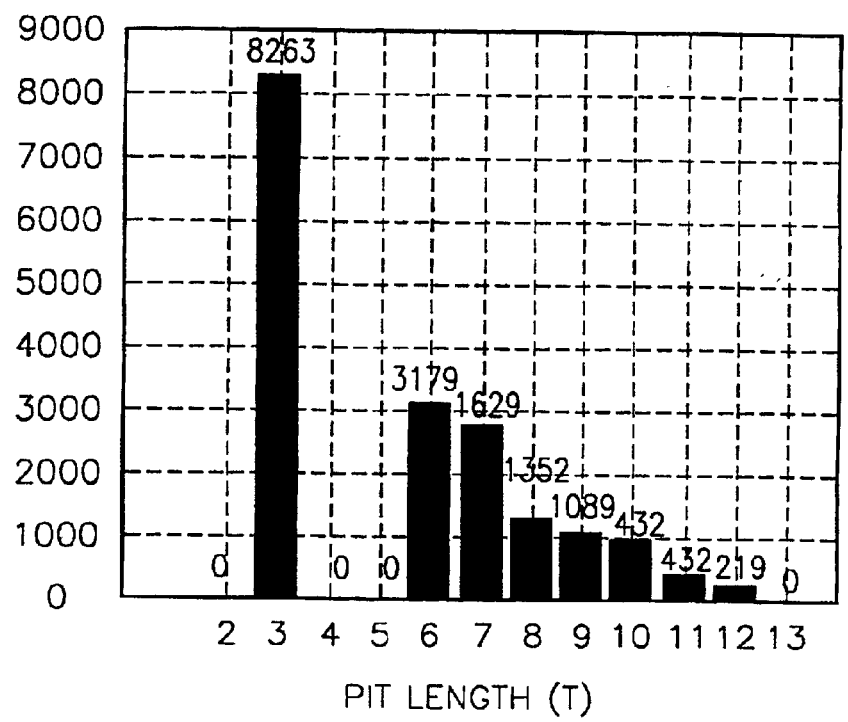
FIG. 15 is a histogram of a frequency of occurrence of each pit length (T) in the header region after selectively spaced coding according to the present invention.

As shown in FIG. 14A, the frequency of occurrence of errors after digitizing is greater for shorter pit lengths. (Compare, for example, the occurrences of pit lengths of 2T and 4T relative to the occurrence of a pit length of 3T with occurrences of pit lengths of 8T and 10T relative to occurrences of a pit length of 9T.) Accordingly, in the RLL modulation method according to the present invention, the data pattern (e.g., pit or land pitch of an optical disc) is selectively spaced depending on pit or land lengths, rather than evenly spaced. In particular, pits or lands, which have a relatively small length so that there is a high probability of errors occurring, are spaced as widely as possible for protection. Meanwhile, the spaces of relatively longer pits or lands, which have a low probability of errors occurring, are maintained or reduced for high recording density. For example, if a minimum pit length is 3T, pit lengths of 4T and 5T, which are between 3T and 6T, are eliminated so that every pit from 6T to the maximum pit or land length is 1T spaced. FIG. 15 is a histogram of the frequency of occurrence of each pit length (T) for the header data after applying the selectively spaced coding described above. FIG. 16 is an example of a modulation code table for the rate 8/9 modulator described in the above embodiments.

As described above, in the data recording and reproducing apparatuses and methods according to the present invention, data are recorded to be resistant to channel distortion and with increased recording density, and the data written to a recording medium is reproduced with improved reliability.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for modulating digitized data to be written to a recording medium, the apparatus comprising:
   a space extending encoder which performs first code transformation to space-extend a run length of the digitized data to a predetermined length and which outputs the space-extended data;
   a multiplexer which multiplexes the space-extended data and additional data transformed by a predetermined second code transformation; and
   a format converter which converts the multiplexed data into a predetermined format which is suitable for writing to the recording medium.

2. The apparatus of claim 1, wherein the space extending encoder transforms binary "1"s of the digitized data to "010" and binary "0"s to "000" by the first code transformation.

3. The apparatus of claim 2, wherein the space extending encoder performs the first code transformation on data belonging to a header region of the recording medium.

4. The apparatus of claim 3, wherein the data belonging to the header region comprises:
   an address mark indicating a start of address;
   variable frequency oscillator (VFO) data which are used to generate synchronization (sync) signals; and
   address data.

5. The apparatus of claim 4, wherein the address data are modulated by a rate 8/9 modulation scheme before being input to the space extending encoder.

6. The apparatus of claim 1, wherein the additional data is user data and the second code transformation is performed on the user data by an eight-to-fourteen modulation plus (EFM+) scheme.

7. The apparatus of claim 1, wherein the multiplexed data format is non-return-to-zero (NRZ) data format and the format converter converts the NRZ data format to a non-return-to-zero-inverse (NRZI) data format.

8. An apparatus for demodulating data from a recording medium, wherein a run length of the data is extended by a predetermined length by modulation before writing the data to the recording medium, the apparatus comprising:
   a detection unit which detects the extended run length data;
   an error correction unit which corrects errors from the detected data; and
   a decoder which detects the error-corrected data by reducing the run length of the data extended through the modulation by the predetermined length to recover data bits corresponding to data bits before the run length was extended.

9. The apparatus of claim 8, further comprising a synchronization (sync) detector which distinguishes data extended by a predetermined length from other data.

10. The apparatus of claim 8, wherein, when the data written to the recording medium is modulated from binary "1"s to "010" and binary "0"s to "000", the error correction unit corrects data in the form of "1xx", "x1x", and "xx1" to "010".

11. The apparatus of claim 10, wherein the decoder decodes data "010" to "1" and data "000" to "0".

12. An apparatus for recording data including header data and user data in a recording medium, the apparatus comprising:
   a first encoder which encodes the header data by extending a run length of the header data through a first code transformation;
   a second encoder which encodes the user data through a second code transformation;
   a multiplexer which multiplexes the transformed data output from the first and second encoders;
   a format converter which converts the multiplexed data output from the multiplexer into a format suitable for writing to the recording medium; and
   a pulse shaping unit which shapes pulses of the data output from the format converter to write the resultant data to the recording medium.

13. The apparatus of claim 12, wherein binary "1"s of the header data are transformed to "010" and binary "0"s of the header data are transformed to "000" by the first code transformation.

14. The apparatus of claim 12, wherein the second code transformation comprises an eight-to-fourteen modulation plus (EFM+) scheme.

15. The apparatus of claim 12, wherein the format converter converts the multiplexed data output from the multiplexer to a non-return-to-zero-inverse (NRZI) format.

16. An apparatus for demodulating data read from a recording medium, wherein the data including header and user data is transformed by first and second code transformations, respectively, prior to being written to the recording medium, the data demodulating apparatus comprising:
   a detection unit which detects the data from the recording medium and digitizes the detected data;
   a synchronization detector which detects a sync signal from the header data;
   a first error correction unit which corrects errors from the header data of the digitized data in synchronization with the sync signal detected by the sync detector;
   a first decoder which decodes the error-corrected header data by a first decoding scheme;
   a second decoder which decodes the user data of the digitized data by a second decoding scheme;
   an address decoder which decodes address data of the header data decoded by the first decoder; and
   a second error correction unit which corrects errors from the user data decoded by the second decoder.

17. The apparatus of claim 16, wherein, where the header data written to the recording medium is modulated from binary "1"s to "010" and binary "0"s to "000", the first error correction unit corrects data in the form of "1xx", "x1x", and "xx1" to "010".

18. The apparatus of claim 17, wherein the first decoder decodes the error-corrected data "010" and data "000" from the first error correction unit to binary "1" and binary "0", respectively.

19. The apparatus of claim 16, wherein the second decoder performs eight-to-fourteen modulation plus (EFM+) demodulation.

20. A method of recording data in a recording medium, the method comprising:
   distinguishing header data from user data;
   coding the header data with run length limited (RLL) codes;
   performing a first code transformation to the header data by extending the run length of the header data coded with run length limited (RLL) codes;
   performing a second code transformation to the user data;

multiplexing the header data transformed by the first code transformation and the user data transformed by the second code transformation;

converting the multiplexed data into a predetermined format suitable for writing to the recording medium; and writing the converted data to the recording medium.

21. The method of claim 20, wherein:

the performing of the first code transformation comprises transforming binary "1"s of the header data to "010" and binary "0"s of the header data to "000".

22. The method of claim 20, wherein the performing of the second code transformation comprises transforming the user data with an eight-to-fourteen modulation plus (EFM+) scheme.

23. The method of claim 20, wherein, in the converting of the multiplexed data, the multiplexed data are converted to a non-return-to-zero-inverse (NRZI) format.

24. A method of reproducing data written to a recording medium, the method comprising:

detecting and digitizing the data written to the recording medium;

converting the digitized data to a predetermined demodulation format;

classifying the format-converted data into header data and user data;

correcting errors from the header data;

decoding the error-corrected header data by a first decoding scheme;

restoring address data from the decoded header data;

decoding the user data by a second decoding scheme; and correcting errors from the decoded user data.

25. The method of claim 24, wherein, in the converting of the digitized data, the digitized data are converted to a non-return-to-zero (NRZ) format.

26. The method of claim 24, wherein, in the correcting of the errors from the header data, where the header data written to the recording medium is modulated from binary "1"s to "010" and binary "0"s to "000", data in the form of "1xx", "x1x", and "xx1" are corrected to "010".

27. The method of claim 26, wherein, in the decoding of the error-corrected header data, the data "010" and data "000" are corrected to "1" and "0", respectively.

28. The method of claim 24, wherein, in the decoding of the user data, the user data is decoded by eight-to-fourteen modulation plus (EFM+) demodulation.

29. A method of writing data to a recording medium with a run length limited (RLL) code of the form RLL (d, k, m, n, s), where d is minimum run length, k is maximum run length, m is the data bit length before modulation, n is the codeword bit length after modulation, and s is the space length between codewords, the method comprising:

using the RLL code with s=2 or greater for pits or lands of the recording medium shorter than a predetermined value, and using the RLL code with s=1 for pits or lands of the recording medium other than the pits or lands shorter than the predetermined value.

30. A method of recording header data and user data on a recording medium, the method comprising:

expanding binary "1"s of the header data to "010" and binary "0"s of the header data to "000";

multiplexing the expanded header data and the user data; and writing the multiplexed data to the recording medium.

31. A method of reproducing data from a recording medium, wherein the data has been processed by expanding "1"s of the data to "010" and binary "0"s of the data to "000" and recording the expanded data, the method comprising:

reading the expanded data from the recording medium in a form "1xx", "x1x", "xx1" or "000", where each x is a "1" or a "0";

correcting the read data having the form "1xx", "x1x" or "xx1" to a form "010";and decoding the corrected data of the form "010" to "1" and decoding the read data having a form "000" to "0".

32. An apparatus for recording original digitized data onto a recording medium and for reproducing data corresponding to the original digitized data from the recording medium, the apparatus comprising:

a space extending encoder which performs a first code transformation to space-extend a run length of the original digitized data to a predetermined length;

a multiplexer which multiplexes the space-extended data and additional data transformed by a predetermined second code transformation;

a format converter which converts the multiplexed data into a predetermined format which is suitable for writing to the recording medium;

a detection unit which detects the extended run length data from the recording medium;

an error correction unit which corrects errors from the detected data; and a decoder which detects the error-corrected data by reducing the run length of the data to recover data bits corresponding to the original digitized data.

33. The apparatus of claim 32, wherein:

the space extending encoder performs the first code transformation by expanding each digital "1" to digital "010" and each digital "0" to digital "000", and a clock rate of the expanded data is greater than a clock rate of the original digitized data.

34. The apparatus of claim 33, wherein:

the error correction unit corrects errors in the detected run length data read from the recording medium by correcting the read data having the form "1xx", "x1x" or "xx1" to a form "010"; and and the decoder decodes the error corrected data of the form "010" to "1" and decodes the read data having a form "000" to "0".

35. The apparatus of claim 32, wherein:

the data is recorded in a run length limited (RLL) code of the form RLL (d, k, m, n, s), where d is a minimum run length, k is a maximum run length, m is a data bit length before modulation, n is a codeword bit length after modulation, and s is the space length between codewords, the RLL code uses s=2 or greater for pits or lands of the recording disc shorter than a predetermined value, and the RLL code uses s=1 for pits or lands of the recording disc other than the pits or lands shorter than the predetermined value.

* * * * *